United States Patent
Gekht et al.

(10) Patent No.: US 9,121,277 B2
(45) Date of Patent: Sep. 1, 2015

(54) ROTARY INTERNAL COMBUSTION ENGINE WITH COOLED INSERT

(75) Inventors: Eugene Gekht, Brossard (CA); Bruno Villeneuve, Boucherville (CA); Mike Fontaine, Boucherville (CA); David Gagnon-Martin, Longueuil (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 178 days.

(21) Appl. No.: 13/366,458

(22) Filed: Feb. 6, 2012

(65) Prior Publication Data

US 2013/0199491 A1    Aug. 8, 2013

(51) Int. Cl.
| | | |
|---|---|---|
| F02B 53/00 | (2006.01) | |
| F01C 21/06 | (2006.01) | |
| F01C 1/22 | (2006.01) | |

(52) U.S. Cl.
CPC .. *F01C 21/06* (2013.01); *F01C 1/22* (2013.01)

(58) Field of Classification Search
CPC ...... F02B 2053/005; F02B 1/04; F02B 53/10; F02B 19/00; F02B 2019/006; F02B 19/1028; Y02T 10/125; F01P 3/14
USPC .............. 123/41.41, 41.85, 241, 209; 418/83, 418/178
See application file for complete search history.

(56) References Cited

U.S. PATENT DOCUMENTS

| | | | |
|---|---|---|---|
| 3,007,460 A | | 11/1961 | Bentele et al. |
| 3,139,836 A | | 7/1964 | Jungbluth |
| 3,246,636 A | | 4/1966 | Bentele |
| 3,682,151 A | * | 8/1972 | Tatsutomi ..................... 123/217 |
| 3,836,293 A | | 9/1974 | Lamm |
| 3,923,433 A | | 12/1975 | Hermes et al. |
| 3,937,185 A | | 2/1976 | Dixon et al. |
| 3,954,088 A | * | 5/1976 | Scott ............................ 123/209 |
| 3,954,356 A | | 5/1976 | Winchell et al. |
| 3,989,424 A | * | 11/1976 | Goloff et al. ..................... 418/83 |
| 4,060,058 A | * | 11/1977 | Hideg et al. ................... 123/209 |
| 4,089,306 A | | 5/1978 | Goloff |
| 4,181,102 A | | 1/1980 | Kogure et al. |
| 4,519,206 A | * | 5/1985 | van Michaels ............... 60/39.54 |
| 4,531,900 A | | 7/1985 | Jones et al. |
| 4,664,607 A | | 5/1987 | Jones |
| 4,759,325 A | | 7/1988 | Jones |
| 6,125,813 A | * | 10/2000 | Louthan et al. ............... 123/209 |
| 2012/0227397 A1 | | 9/2012 | Willi et al. |

FOREIGN PATENT DOCUMENTS

EP    2497902    9/2012

* cited by examiner

*Primary Examiner* — Thomas Denion
*Assistant Examiner* — Thomas Olszewski
(74) *Attorney, Agent, or Firm* — Norton Rose Fulbright Canada

(57) ABSTRACT

A rotary internal combustion engine having an insert opening defined in a hot area of one of the walls of the stator body and in communication with its internal cavity, at least one groove defined within the opening around a perimeter thereof, at least one coolant inlet channel defined therein in communication with each groove, and at least one coolant outlet channel defined therein in communication with each groove. A cooling jacket lines the insert opening, the cooling jacket cooperating with each groove to define a cooling gallery around the insert opening. An insert is sealingly received in the cooling jacket, the insert being made of a material having a greater heat resistance than that of the wall.

20 Claims, 5 Drawing Sheets

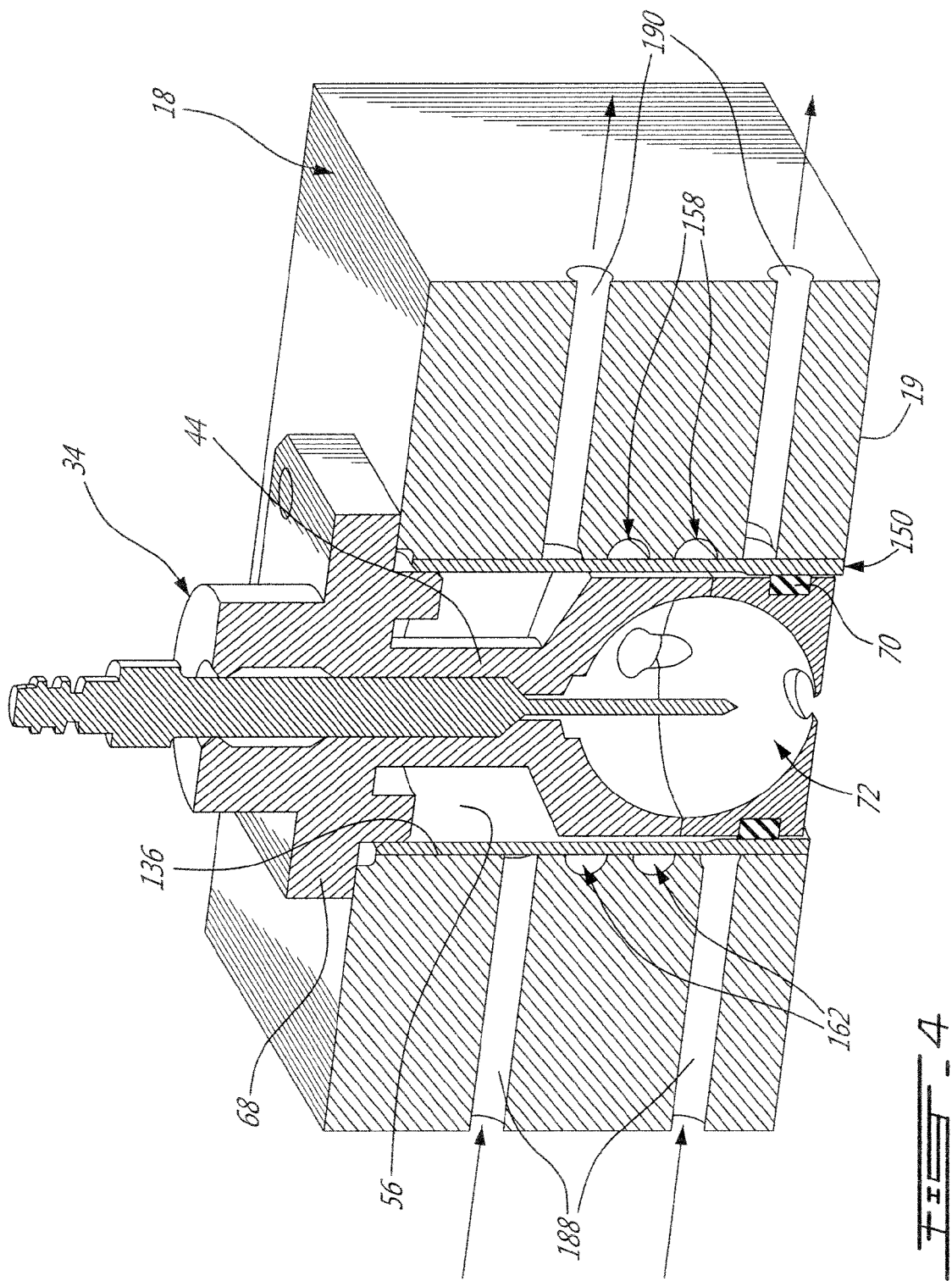

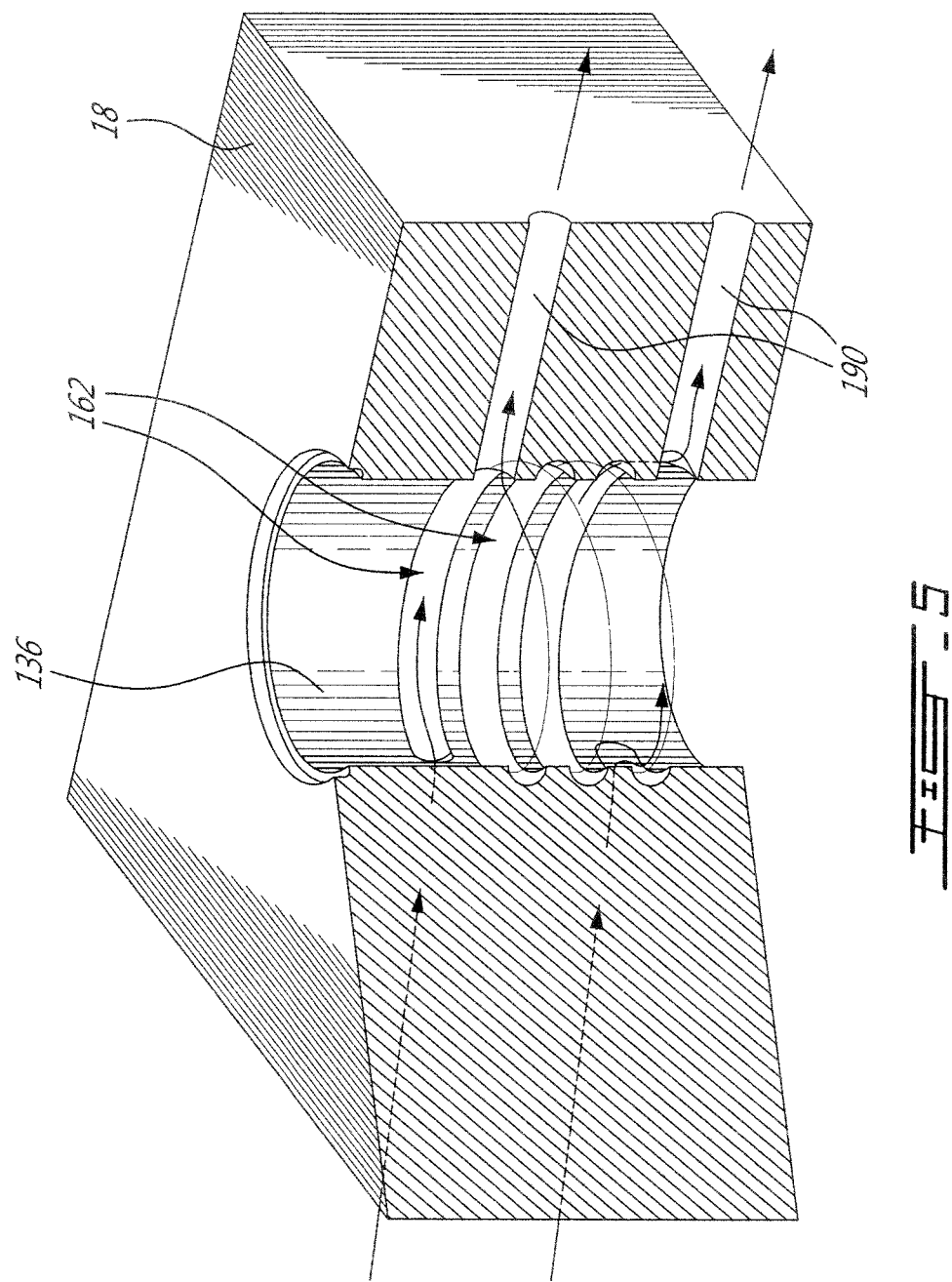

ROTARY INTERNAL COMBUSTION ENGINE WITH COOLED INSERT

TECHNICAL FIELD

The application relates generally to a rotary internal combustion engine, more particularly, to the cooling of an insert in such engines.

BACKGROUND OF THE ART

Rotary engines, such as for example Wankel engines, use the eccentric rotation of a piston to convert pressure into a rotating motion, instead of using reciprocating pistons. In these engines, the rotor includes a number of apex or seal portions which remain in contact with a peripheral wall of the rotor cavity of the engine throughout the rotational motion of the rotor to create a plurality of rotating chambers when the rotor rotates.

The stator body of a rotary engine may include high temperature inserts in locally hot areas. Such inserts are typically cooled by providing an air gap around the insert. However in some cases cooling through the surrounding air gap may be insufficient to protect the remainder of the body from the high temperature of the insert.

SUMMARY

In one aspect, there is provided an internal combustion engine comprising: a stator body having an internal cavity enclosed by a plurality of walls, one of the walls having an insert opening defined in a hot area thereof and in communication with the internal cavity, at least one groove defined within the opening around a perimeter thereof, at least one coolant inlet channel defined therein in communication with each groove, and at least one coolant outlet channel defined therein in communication with each groove; a rotor body received within the internal cavity and sealingly engaged with the walls to define at least one chamber undergoing intake, compression, expansion and exhaust phases; a cooling jacket lining the insert opening, the cooling jacket cooperating with each groove to define a cooling gallery around the insert opening; and an insert sealingly received in the cooling jacket, the insert being made of a material having a greater heat resistance than that of the one of the walls.

In another aspect, there is provided a stator body for a Wankel engine comprising: two axially spaced apart end walls; a peripheral wall extending between the end walls and defining an internal cavity therewith, the cavity having an epitrochoid shape defining two lobes; a cooling jacket lining an opening defined in a hot area of one of the walls of the rotor body, the opening being in communication with the internal cavity; an insert made of a material having a greater heat resistance than that of the walls and sealingly received in the cooling jacket; at least one cooling gallery defined by a groove formed within the one of the walls around and in communication with the opening, the cooling gallery being bordered by the cooling jacket; at least one coolant inlet channel defined through the stator body in communication with each cooling gallery; and at least one coolant outlet channel defined through the stator body in communication with each cooling gallery.

In yet another aspect, there is provided a method of cooling an insert in a hot zone of a wall of a body of an internal combustion engine, the method comprising: preventing direct contact between at least a portion of the insert and the wall by sealingly surrounding the portion of the insert with a cooling jacket connected to the wall; and circulating a coolant flow through the wall around the cooling jacket and in contact therewith.

DESCRIPTION OF THE DRAWINGS

Reference is now made to the accompanying figures in which:

FIG. 4 is a schematic tridimensional cross-sectional view of an insert and surrounding cooling arrangement according to an alternate embodiment; and FIG. 5 is a schematic tridimensional cross-sectional view of the portion of the stator body shown in FIG. 4 with the insert and cooling jacket omitted.

DETAILED DESCRIPTION

Figure 1:
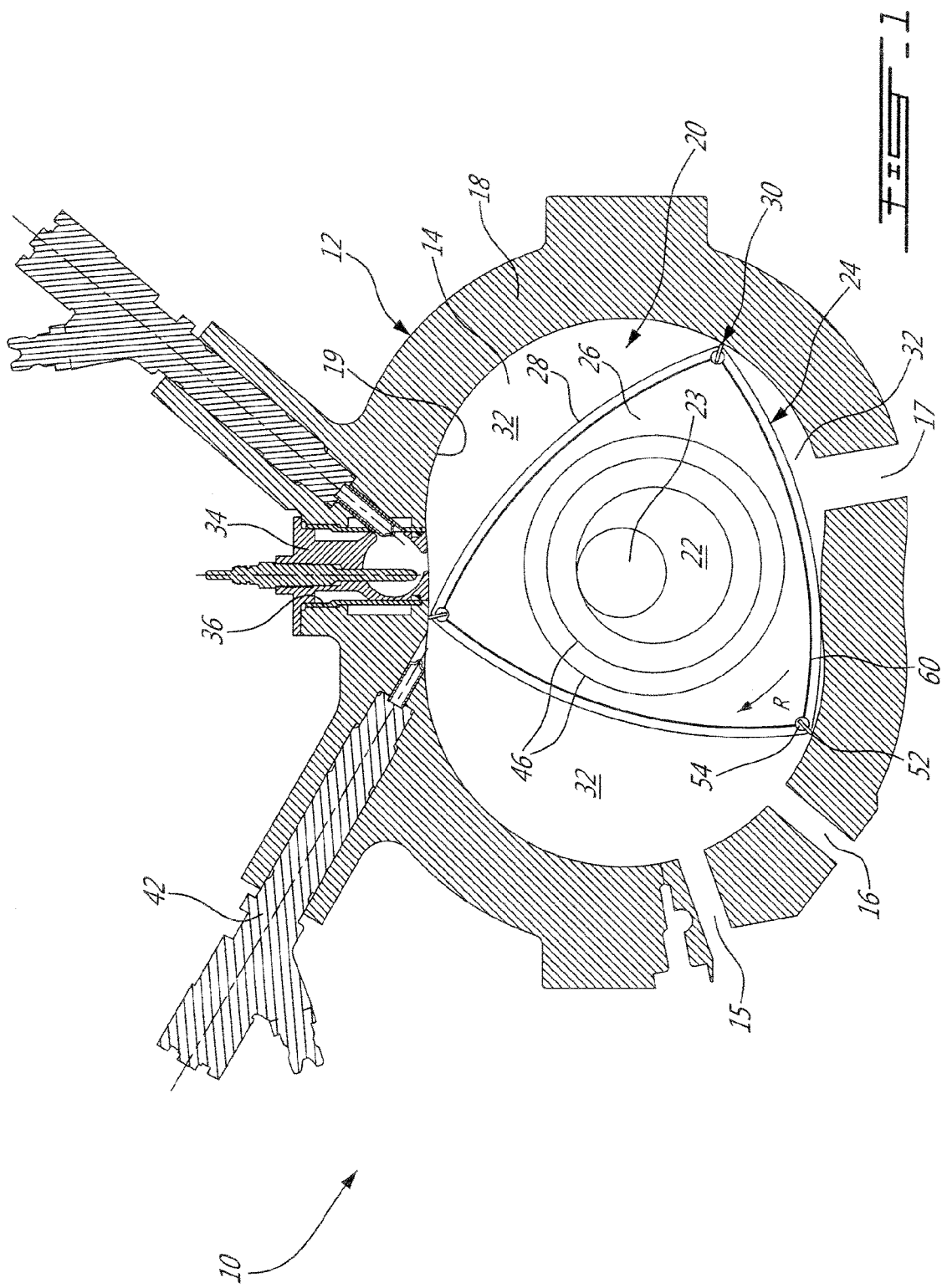
FIG. 1 is a schematic cross-sectional view of a rotary internal combustion engine in accordance with a particular embodiment.

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In such a system, air is compressed by a compressor before entering the Wankel engine, and the engine drives one or more turbine(s) of the compound engine. In another embodiment, the rotary engine 10 is used without a turbocharger, with air at atmospheric pressure.

The engine 10 comprises an outer body 12 having axially-spaced and walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface 19 of the peripheral wall 18 to form three rotating working chambers 32 between the inner rotor 24 and outer body 12. A recess (not shown) is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

The rotor 24 is journaled on an eccentric portion 22 of a shaft 23 and includes a phasing gear (not shown) co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The rotor 24 performs three rotations for each orbital revolution. Oil seals 46 are provided around the phasing gear to prevent leakage flow of lubricating oil radially outwardly thereof between the respective rotor end face 26 and outer body end wall 14.

At least one intake port 15, 16 is defined through one of the end walls 14 or the peripheral wall 18 for admitting air (atmospheric or compressed) into one of the working chambers 32, and at least one exhaust port 17 is defined through one of the end walls 14 or the peripheral wall 18 for discharge of the exhaust gases from the working chambers 32. For example, in the embodiment shown, a primary intake port 15 and a secondary intake port 16 as well as the exhaust port 17 are all defined through the peripheral wall 18. The intake and exhaust ports 15, 16, 17 are positioned such that during one orbital revolution of the rotor 24, each chamber 32 moves around the rotor cavity 20 with a variable volume to undergo the four phases of intake, compression, expansion and exhaust, these phases being similar to the strokes in a reciprocating-type internal combustion engine having a four-stroke cycle. The peripheral wall 18 receives a main fuel injector 42 therethrough extending in communication with the rotor cavity 20.

A high temperature insert 34 is received in a corresponding opening 36 defined through the peripheral wall 18 of the outer body 12, the opening 36 being defined in communication with the rotor cavity 20 in a high temperature region of the outer body 12. In the embodiment shown, the insert 34 defines a subchamber for pilot fuel injection and ignition, and is located forwardly of the main injector 42 with respect to the direction R of the rotor rotation and revolution.

Figure 2:
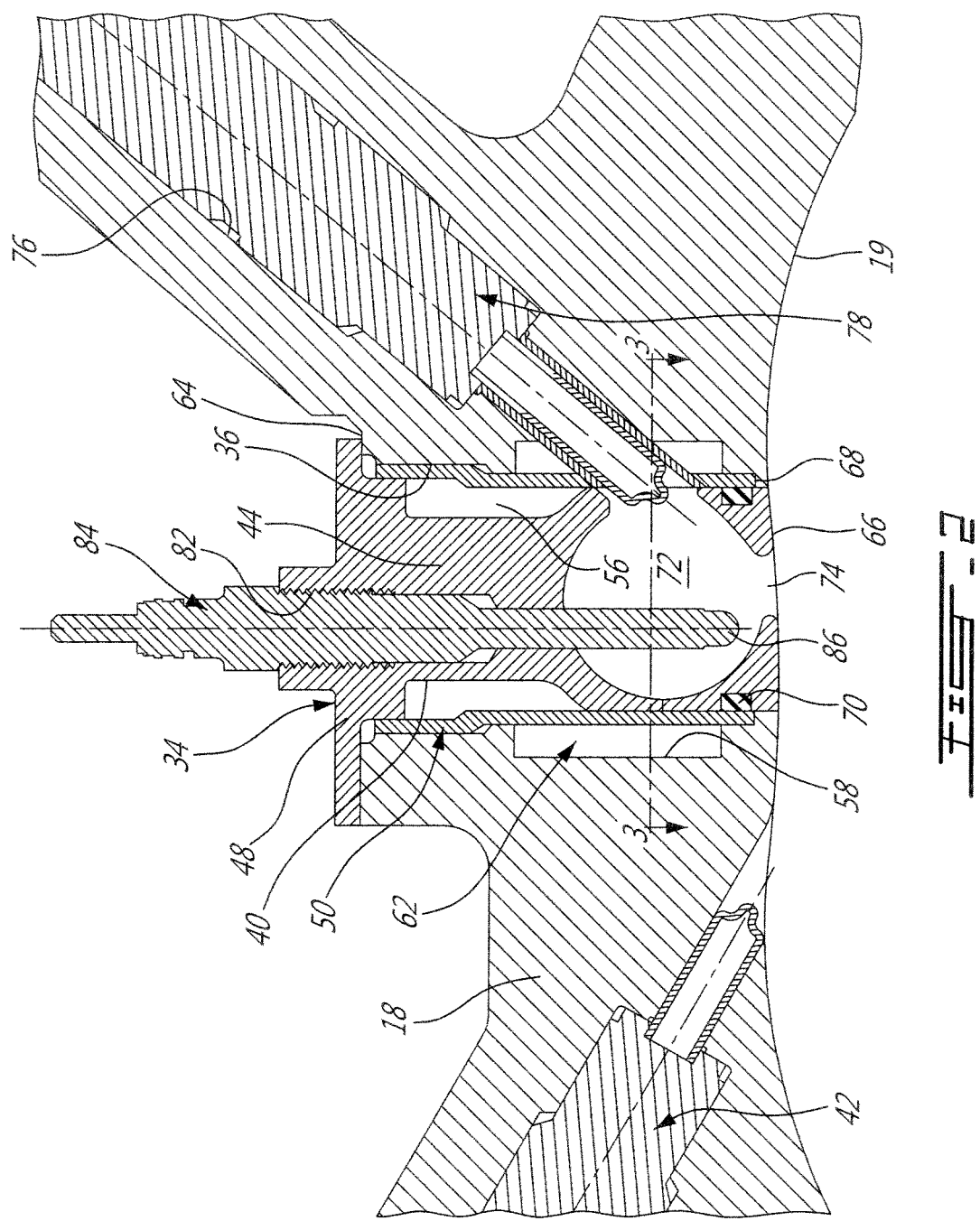
FIG. 2 is a schematic cross-sectional view of an insert and surrounding cooling arrangement of the engine of FIG. 1.

Referring particularly to FIG. 2, the insert includes an elongated body 44 extending across a thickness of the peripheral wall 18. The insert body 44 includes an enlarged flange 48 at its outer and which abuts the outer surface 64 of the peripheral wall 18 and is connected thereto, for example through bolts with appropriate sealing such as a gasket or crush seal (not shown), brazing, etc. The insert body 44 has an inner surface 66 which is aligned with the inner surface 19 of the peripheral wall 18 to define the cavity 20. The insert body 44 is made of a material having a greater heat resistance (e.g. is able to resist a higher temperature without substantial loss of mechanical properties, has a higher maximum recommended operating temperature) than that of the peripheral wall 18, which in a particular embodiment is made of aluminium. In a particular embodiment, the insert body 44 is made of an appropriate type of high temperature alloy such as a Nickel based super alloy. In a particular embodiment, the insert body 44 is made of a material which can be used in temperatures of at least 2000° F. (1093° C.). In a particular embodiment, the insert body 44 is made of a material which can be used in temperatures of at least 2200° F. (1204° C.).

The insert body 44 has a pilot subchamber 72 defined therein in communication with the rotor cavity 20. In the embodiment shown, the subchamber 72 has a circular cross-section; alternate shapes are also possible. The subchamber 72 communicates with the cavity through at least one opening 74 defined in the inner surface 66. The subchamber 72 has a shape forming a reduced cross-section adjacent the opening 74, such that the opening 74 defines a restriction to the flow between the subchamber 72 and the cavity 20. The opening 74 may have various shapes and/or be defined by a pattern of multiple holes.

The peripheral wall 18 has a pilot injector elongated hole 76 defined therethrough, at an angle with respect to the insert 34 and in communication with the subchamber 72. A pilot fuel injector 78 is received and retained within the corresponding hole 76, with the tip 80 of the pilot injector 78 being received in the subchamber 72. In a particular embodiment the pilot injector 78 and main injector 42 inject heavy fuel, e.g. diesel, kerosene (jet fuel), equivalent biofuel, etc. into the chambers 32.

The insert body 44 also has an ignition element elongated hole 82 defined therein, also in communication with the subchamber 72. An ignition element 84 is received and retained within the corresponding hole 82, with the tip 86 of the ignition element 84 being received in the subchamber 72. In the embodiment shown, the ignition element 84 is a glow plug. Alternate types of ignition elements 84 which may be used include, but are not limited to, plasma ignition, laser ignition, spark plug, microwave, etc.

In the embodiment shown, the insert body 44 has a circular groove 40 defined in its outer surface between the flange 48 and the subchamber 72, the purpose of which will be further detailed below. Although the insert body 44 is shown has being made of a single piece, it can alternately include two or more complementary pieces made of the same or different materials.

An annular cooling jacket 50 lines the insert opening 36 and surrounds the insert 34 across most of the thickness of the peripheral wall 18. In a particular embodiment, the cooling jacket 50 is made of steel. In the embodiment shown, a wall flange 68 extends in the insert opening 36 adjacent the inner surface 19, and the cooling jacket 50 abuts the surface of the wall flange 68 opposite the inner surface 19. The cooling jacket 50 is connected to the peripheral wall 18, for example by being brazed or welded thereto. The insert 34 is sealingly received within the cooling jacket 50, and a gasket 70 is provided between the cooling jacket 50 and the insert body 44 adjacent the wall flange 68. The cooling jacket 50 extends close to the insert outer flange 48, and as such extends between the peripheral wall 18 and the insert 34 across most of the length of the insert body 44. The cooling jacket 50 thus helps reduce direct contact between the insert body 44 and the peripheral wall 18. An annular air gap 56 is formed around the insert body 44 by the cooperation of the circular groove 40 of the insert body 44 and of the cooling jacket 50.

Figure 3:
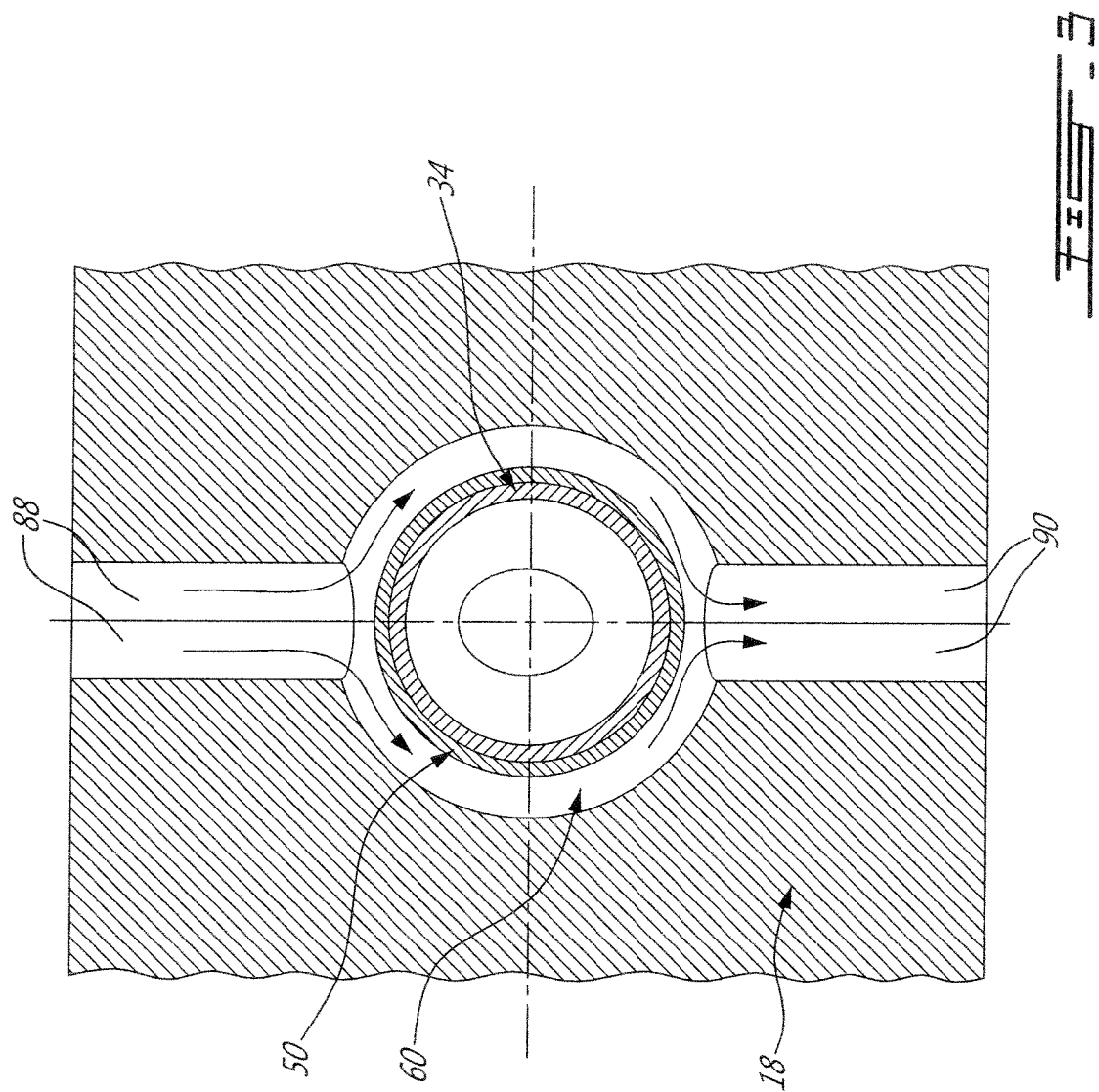
FIG. 3 is a schematic cross-sectional view of the insert of FIG. 2 taken along lines 3-3 thereof.

The wall of the insert opening 36 also has a circular groove 58 defined therein, aligned with part of the subchamber 72 and extending around the cooling jacket 50. The circular groove 58 and cooling jacket 50 cooperate to define an annular cooling gallery 62. In the embodiment shown, the cooling gallery 62 has a rectangular cross-section, but other cross-sectional shapes are also possible. As can be seen from FIG. 3, the cooling gallery 62 is in communication with one or more coolant inlet channels 88 and one or more coolant outlet channels 90 defined through the peripheral wall 18. The inlet and outlet channels 88, 90 may communicate with other coolant channels (not shown) defined through other portions of the engine outer body 12 such as to be part of a same coolant distribution network; alternately, the insert 34 may be independently cooled.

In use, a flow of coolant circulates within the cooling gallery 62 around the cooling jacket 50 to cool the jacket 50 and limit heat transfer to the engine outer body 12. In a particular embodiment, the coolant is water. Other adequate types of cooling fluids can alternately be used.

Referring to FIGS. 4-5, an insert 34 and cooling arrangement according to an alternate embodiment is shown. The insert 34 is as previously described and as such will not be described further herein. In this embodiment, the wall flange is omitted, and the cooling jacket 150 extends up to the inner surface 19 of the peripheral wall 18. The wall of the insert opening 136 includes two alternating helical grooves 158 defined around the cooling jacket 150 in alignment with part of the subchamber 72. The helical grooves 158 and cooling jacket 150 cooperate to define two helical cooling galleries 162 (e.g. configured like a two-start worm screw) around the cooling jacket 150. In the embodiment shown, the cooling galleries 162 have a semi-circular cross-section, but other cross-sectional shapes are also possible. Each cooling gallery 162 is in communication with a coolant inlet channel 188 and with a coolant outlet channel 190 defined through the peripheral wall 18, such that coolant flow circulates within each cooling gallery 162 around the cooling jacket 150. The two coolant inlet channels 188 may be in communication with different cooling fluid source or with a same cooling fluid source.

Alternate configurations for the cooling gallery(ies) 62, 162 are also possible, including but not limited to galleries defined by a single helical channel and by multiple annular channels.

In an alternate embodiment, a similar insert may be used to define another hot area of the stator body 12, for example the exhaust port 17. In a particular embodiment, the insert is an annular element with inner walls defining the exhaust port 17. The insert may be made for example of a high temperature alloy, or may alternately be made of steel if the temperature around the exhaust port 17 is within acceptable limits for the use of steel. The insert is sealingly received in a cooling jacket 50, 150 as described above, and the cooling jacket is received in a corresponding opening of the engine outer body 12 which communicates with the rotor cavity 20. The opening may be defined in the peripheral wall 18, such as for the exhaust port 17 shown in FIG. 1, or in one of the end walls 14 in the case of an axial exhaust port. The cooling gallery(ies) 62, 162 may have any appropriate configuration, included but not limited to the configurations shown in FIG. 3 and FIGS. 4-5.

In another alternate embodiment, the insert is used to retain an additional ignition element, or the main ignition element in the case of an engine without a pilot subchamber. The insert is shaped to retain the ignition element in a desired orientation and is sealingly received in a cooling jacket 50, 150 as described above, and the cooling jacket is received in a corresponding opening of the engine outer body 12 which communicates with the rotor cavity 20. The cooling gallery(ies) 62, 162 may have any appropriate configuration, included but not limited to the configurations shown in FIG. 3 and FIGS. 4-5.

The use of the insert, cooling jacket and cooling gallery (ies) may help to provide a more uniform and efficient cooling system for the high temperature area, which may in turn help improve the durability of the base material of the engine outer body 12. The more uniform and efficient cooling may also allow for the use of lighter low temperature materials as the base material for the engine outer body 12. For example, in a particular embodiment where the insert is used to define a pilot subchamber, temperatures within the insert may be about 2300° F. (1260° C.) while temperatures within the engine outer body 12, for example made of aluminium, may remain below 500° F. (260° C.).

The above description is meant to be exemplary only, and one skilled in the art will recognize that changes may be made to the embodiments described without departing from the scope of the invention(s) disclosed. For example, the mechanical arrangement of the Wankel engine described above is merely one example of many possible configurations which are suitable for use with the present invention(s). Moreover, the insert, cooling jacket and cooling gallery(ies) may be used in other types of internal combustion engines, including but not limited to other types of rotary engines. The insert, cooling jacket and cooling gallery(ies) may be used in other hot areas of the stator body. Hence, modifications which fall within the scope of the present invention will be apparent to those skilled in the art, in light of a review of this disclosure, and such modifications are intended to fall within the appended claims.

The invention claimed is:

1. A rotary internal combustion engine comprising:
a stator body having an internal cavity enclosed by a plurality of walls, one of the walls having an insert opening defined across a thickness of the one of the walls in a hot area thereof and in communication with the internal cavity, at least one groove defined in the one of the walls within the insert opening to extend around a perimeter of the insert opening, at least one coolant inlet channel defined in the one of the walls in communication with each groove, and at least one coolant outlet channel defined in the one of the walls in communication with each groove;
a rotor body received within the internal cavity and sealingly engaged with the walls to define at least one chamber undergoing intake, compression, expansion and exhaust phases as the movable body moves;
a cooling jacket received in and lining the insert opening, the cooling jacket cooperating with each groove to define a cooling gallery around the insert opening, the cooling gallery surrounding the cooling jacket; and
an insert sealingly received in the cooling jacket, the cooling gallery surrounding the insert with the cooling jacket extending between the cooling gallery and the insert, the insert being made of a material having a greater heat resistance than that of the one of the walls, wherein along most of the length of the insert defined along the thickness of the one of the walls, the cooling jacket extends between the insert and the one of the walls to prevent direct contact between the insert and the one of the walls.

2. The engine as defined in claim 1, wherein the plurality of walls of the stator body include two axially spaced apart end walls and a peripheral wall extending between the end walls, the internal cavity having an epitrochoid shape defining two lobes, and the rotor body has three circumferentially spaced apex portions, the rotor body being engaged to an eccentric portion of a shaft to rotate and perform orbital revolutions within the cavity with each of the apex portions remaining in sealing engagement with the peripheral wall and separating three rotating chambers of variable volume defined in the cavity around the rotor body.

3. The engine as defined in claim 2, wherein the insert opening is defined in the peripheral wall.

4. The engine as defined in claim 3, wherein the insert has a subchamber defined therein and an inner surface bordering the cavity, the subchamber communicating with the cavity through at least one opening defined in the inner surface, the insert receiving a tip of a pilot fuel and of an ignition element within the subchamber, and the cooling gallery being defined around the subchamber.

5. The engine as defined in claim 1, wherein the insert is made of a high temperature metal alloy.

6. The engine as defined in claim 1, wherein the at least one groove defines an annular groove around the insert opening.

7. The engine as defined in claim 1, wherein the at least one groove includes at least one helical groove.

8. The engine as defined in claim 1, wherein the insert has a groove defined around a perimeter thereof, the cooling jacket cooperating with the insert groove to define an air channel around the insert.

9. The engine as defined in claim 1, wherein the cooling jacket is brazed or welded to the at least one wall within the insert opening.

10. A stator body for a Wankel engine comprising:
two axially spaced apart end walls;
a peripheral wall extending between the end walls and defining an internal cavity therewith, the cavity having an epitrochoid shape defining two lobes;
a cooling jacket lining an opening defined in a hot area across a thickness of one of the walls of the rotor body, the opening being in communication with the internal cavity;
an insert made of a material having a greater heat resistance than that of the walls and sealingly received in the opening with the cooling jacket surrounding the insert, the insert having a length defined along the thickness of the one of the walls, and wherein along most of the length of the insert, the cooling jacket extends between the insert and the one of the walls to prevent direct contact between the insert and the one of the walls;
at least one cooling gallery defined by a groove formed within the one of the walls, the groove extending around the cooling jacket and in communication with the opening, the cooling gallery being bordered by the cooling jacket and being defined around the insert, the cooling jacket extending between the cooling gallery and the insert;
at least one coolant inlet channel defined through the stator body in communication with each cooling gallery; and
at least one coolant outlet channel defined through the stator body in communication with each cooling gallery.

11. The stator body as defined in claim 10, wherein the opening is defined in the peripheral wall.

12. The stator body as defined in claim 11, wherein the insert has a subchamber defined therein and an inner surface bordering the internal cavity, the subchamber communicating with the internal cavity through at least one opening defined in the inner surface, at least one of the insert and the peripheral wall having a pilot fuel injector elongated hole defined therethrough communicating with the subchamber and sized to receive a pilot fuel injector therein, and at least one of the insert and the peripheral wall having an ignition element elongated hole defined therethrough communicating with the subchamber and sized to receive an ignition element therein.

13. The stator body as defined in claim 10, wherein the insert is made of a high temperature metal alloy.

14. The stator body as defined in claim 10, wherein the at least one cooling gallery includes an annular cooling gallery surrounding the cooling jacket.

15. The stator body as defined in claim 10, wherein the at least one cooling gallery includes at least one helical cooling gallery defined around the cooling jacket.

16. The stator body as defined in claim 10, wherein the insert has a groove defined around a perimeter thereof, the cooling jacket cooperating with the insert groove to define an air channel around the insert.

17. The stator body as defined in claim 10, wherein the cooling jacket is brazed or welded to the at least one wall within the opening.

18. A method of cooling an insert in a rotary engine having a stator body defining an internal cavity, the insert received in an in insert opening defined across a thickness of a wall of the stator body in a hot area thereof and in communication with the internal cavity, the insert having a length extending across the thickness of the wall, the method comprising:
preventing direct contact between the insert and the wall along most of the length of the insert by sealingly surrounding the insert with a cooling jacket connected to the wall; and
circulating a coolant flow through the wall around the insert by circulating the cooling flow around the cooling jacket and in contact with the cooling jacket, the coolant flow circulating on a side of the cooling jacket opposite of the insert.

19. The method as defined in claim 18, wherein circulating the coolant flow includes circulating the coolant around the cooling jacket following a helical pattern.

20. The method as defined in claim 18, further comprising providing an air channel between the cooling jacket and the insert.

* * * * *